3,300,546
WATER SOLUBLE ENVELOPE PREPARED FROM A GRAFT POLYMER OF ALKYL ACRYLATE ON A POLYVINYL ALCOHOL/POLYVINYL ACETATE CO-POLYMER
Robert L. Baechtold, Cranford, N.J., assignor to American Cyanamid Company, Stamford, Conn., a corporation of Maine
No Drawing. Filed Oct. 5, 1965, Ser. No. 493,242
6 Claims. (Cl. 260—876)

This is a continuation-in-part of my copending application Serial No. 250,996, filed January 14, 1963 now abandoned.

The present invention relates to water-soluble, water- and heat-sealable film material suitable for use as a water-soluble wrap or for fabrication into water-soluble envelopes. The invention includes the film itself and methods for the manufacture of the film.

Tough, flexible, transparent, colorless, non-tacky, permanently plasticized, water- and heat-sealable films have long been in demand for the packaging of household materials intended to be dissolved or dispersed in water, for example, soap powder, detergent powder, dry bleach, dyes, and water-softening powders.

Sealed packages, envelopes or bags containing weighed amounts of the household materials referred to above may be charged directly into dishwashers or laundry machines as the case may be, eliminating the weighing step that would otherwise be necessary for the housewife to perform.

Film material possessing the above-stated combination of properties has long been sought, but very few films possessing these properties have been found.

The discovery has now been made that films composed of a water-soluble low molecular weight polyvinyl alcohol having a minor grafted content of a water-soluble aliphatic acrylate, as more particularly defined below, possess the above-stated combination of properties.

The further discovery has been made that ungrafted polyvinyl alcohol is compatible with the above-described grafted polyvinyl alcohol in all proportions and when present therewith as a uniform blend possesses the property of increasing the tensile strength of the grafted polyvinyl alcohol without significantly affecting its toughness, flexibility, transparency and sealing properties. The improvement in strength begins with incorporation of the first increment of ungrafted polyvinyl alcohol into the grafted polyvinyl alcohol, and continues until the properties of the grafted polyvinyl alcohol-polyvinyl alcohol blend become essentially those of the ungrafted polyvinyl alcohol.

In the present specification the term "polyvinyl alcohol" designates a polyvinyl alcohol which is substantially composed of —CH$_2$CH(OH)— and —CH$_2$CH(OOCCH$_3$)— linkages in molar ratio between 95:5 and 80:20 and which is consequently water-soluble. Polyvinyl alcohol is generally made by partial hydrolysis of polyvinyl acetate, and hence is also termed "hydrolyzed polyvinyl acetate." "Water-soluble polyvinyl alcohol" is generally a polyvinyl acetate which has been hydrolyzed to the molar extent of 80% to 95%. The molecular weights referred to herein are weight average molecular weights calculated from intrinsic viscosity data using the formula for intrinsic viscosity weight ($\overline{M}\nu$) developed by A. Berensniewicz and described in Journal of Polymer Science, 39, 63 (1959). The grades of water-soluble polyvinyl alcohol described herein are commercially available.

The water-soluble polyvinyl alcohol employed herein as substrate for the grafting step may be and preferably is partially hydrolyzed polyvinyl acetate and has a weight average molecular weight of about 15,000 to 150,000. It is easily soluble in cold water and is commercially available under the names "Elvanol 51–05" and "Elvanol 52–22."

The aliphatic acrylate which it contains in grafted state is an ester of acrylic acid with a water-soluble alcohol (i.e., an alcohol which is at least 5% by weight soluble in water at 20° C.). Acrylates which are suitable for grafting are the acrylic esters of methanol, ethanol, n-propanol, isopropyl alcohol, t-butanol, 2-cyanoethanol (2-hydroxyacetonitrile), 2-methoxyethanol, and the acrylates formed by reacting 1 mol of acrylic acid with 1 mol of glycol or diethylene glycol. Mixtures of these acrylates may be employed.

The amount of grafted acrylate present in the film of the present invention is that which renders the film tough without rendering it water-insoluble or unduly difficult to dissolve. In every instance, a significant improvement in toughness is achieved when the weight of grafted acrylate is 5% of the resulting film; the maximum desirable amount in each instance depends on the molecular weight of the polyvinyl alcohol and the particular alcohol substituent present. In general, more of the acrylate (up to about 50% of the weight of the grafted product) can be grafted when the molecular weights of the polyvinyl alcohol and the alcohol component of the acrylic ester are low with production of a readily water-soluble tough film.

The amount of grafted acrylic ester in the polyvinyl alcohol can be and advantageously is usually more, up to 80% of the weight of the grafted product. The presence of this larger amount of grafted acrylic ester is usually most advantageous when it is desired to blend the grafted polyvinyl alcohol with ordinary (ungrafted) polyvinyl alcohol, so as to form the stronger and tougher product described above.

In the case of such blends, it is necessary for the amount of acrylic ester which is grafted to be at least 10% of the weight of the grafted polyvinyl alcohol, to permit a substantial amount of grafted acrylic ester to be present when the grafted polyvinyl alcohol is blended with a significant amount of ungrafted polyvinyl alcohol as toughening agent and to permit the weight of grafted acrylic ester in the final film to be at least 5% of the gross weight of said film.

The molecular weight of the polyvinyl alcohol which is used as strengthening agent for the grafted polyvinyl alcohol is at least 100,000, so as to provide the desired strengthening action. The molecular weight of the polyvinyl alcohol may be greater up to the point where the polymer becomes brittle. The molecular weight may be and advantageously is 200,000 or even higher.

The strengthening action imparted by the ungrafted polyvinyl alcohol becomes apparent even when only a small amount of this polyvinyl alcohol is in blended admixture with the grafted polyvinyl alcohol. As little as 10% of the polyvinyl alcohol, based on the weight of the grafted polyvinyl alcohol, produces a significant increase in tensile strength of the grafted polyvinyl alcohol, so that evidently even smaller amounts of the ungrafted polyvinyl alcohol produce a valuable effect. The strengthening effect is strongly evident even when the weight of the ungrafted polyvinyl alcohol is equal to 200% of the weight of the grafted polyvinyl alcohol, so that larger amounts than this evidently produce a major beneficial effect. Best strengthening per increment of ungrafted polyvinyl alcohol present appears to occur when the weight of ungrafted polyvinyl alcohol is about 100%–150% of the weight of the grafted polyvinyl alcohol.

The films of the present invention are produced by laying down an aqueous or organic solvent solution of grafted polyvinyl alcohol as such or in blended admixture with ungrafted polyvinyl alcohol and evaporating the water or organic liquid, by extruding the polymer or mixture of polymers at elevated temperature, or in other convenient manner.

The grafted polyvinyl alcohol is produced by grafting the desired acrylic ester upon the desired polyvinyl alcohol by use of the ceric ion graft polymerization technique disclosed in U.S. Patent No. 2,922,768, which is incorporated herein by reference.

As the amount of ceric salt and acrylic ester used in the process of the present invention are increased, the tear strength and elongation of the film are proportionately increased. In those films drawn down from the grafted copolymer alone, the elongation goes through a maximum with increased ceric salt while the modulus of rupture decreases. From this it can be seen that the ultimate film properties are a function of the amount of ceric salt and acrylic ester used in the grafting process. One may use from about 0.029 to about 0.152 milli-equivalent of ceric salt per gram of polyvinyl alcohol for the grafting reaction and water-solubility characteristic. If one is to prepare an ethyl acrylate grafted polyvinyl alcohol which is to be blended with an unmodified polyvinyl alcohol composition, one may graft onto the backbone larger amounts of the ethyl acrylate such as about 10% and 80% by weight based on the total weight of the grafted copolymer. To accomplish this one may use ceric salts in amounts up to about 0.438 milli-equivalent per gram of polyvinyl alcohol although the lower amounts recited hereinabove can also be used particularly if the amount of ethyl acrylate to be grafted to said backbone is less than about 55–80%.

In performing the grafting step, an aqueous medium is preferred for economic reasons and particularly in view of the fact that best results are achieved by controlling the pH at a value not greater than about 3.5. The temperature of the reaction is preferably between about 10° C. and 60° C. Temperatures significantly above 70° C. should ordinarily be avoided. It is preferred to carry out both the grafting step and the film producing step at atmospheric pressure although both subatmospheric and superatmospheric pressures may be used. The ceric ion used in the process of the present invention is introduced into the reaction sphere in the form of a salt. Among the salts that may be used in the present invention are ceric nitrate, ceric sulfate, ceric ammonium nitrate, ceric ammonium sulfate, ceric ammonium pyrophosphate, ceric iodate, ceric salts of organic acids e.g., cerium naphthenate, cerium linoleate, and the like. These ceric salts may be used either singly or in combination with one another. Ceric compounds which are capable of forming ceric salts in situ under the acid conditions of the polymerization reaction such as ceric oxide, ceric hydroxides and the like may be used. In order to achieve acidity at the pH level desired, namely, 3.5 or below and preferably 1–2, one may use any one of the conventional acidic materials available such as hydrochloric acid, nitric acid, sulfuric acid, phosphoric acid, pyrophosphoric acid, and the like. It is generally desirable to use the same acidifying agent to achieve and control the pH as is used to produce the ceric salt. For instance, if one uses ceric nitrate as the ceric salt one would then preferably use nitric acid as the acidifying agent.

In preparing the film, a solution of the grafted copolymer or a solution of a blend of the grafted copolymer with ungrafted polyvinyl alcohol is drawn down on a suitable supporting member and the film is treated so as to remove the solvent, e.g. water. Temperatures from about room temperature to a temperature above the boiling point of the solvent may be used. Elevated temperatures are preferred to promote rapid volatilization of the solvent. The solids content of the film-forming solution is not critical nor is the viscosity since one can use such a copolymer solution having a Brookfield viscosity of between about 4000 and 20,000 centipoises. The preferred range for casting films is between about 8,000 and 12,000 centipoises. For a grafted polyvinyl alcohol alone the solids content of the solution may range from about 30–40% while in the case of a blend of grafted and ungrafted polyvinyl alcohol, the solids content of the solution may be about 15–20%. Since there is a marked dependence on temperature, hot solutions of the film-forming material can be cast at much higher solids contents because such solutions still have workable viscosities.

In casting films from the grafted copolymers or the blends, one may use a typical solution casting technique such as by pouring the polymer solution onto a chrome plate and drawing down with a doctor blade followed by air drying and/or oven drying. The drying conditions should be comparatively mild in order to retain the water-solubility of the polyvinyl alcohol portion of the composition. The temperatures referred to hereinabove for the drying purposes should be observed. Additionally the film may be cast on a continuously travelling stainless steel belt having an oven- or infrared-heated take off point for removal of the solvent. The film is readily stripped from such a belt in flexible dry state and hence is self-supporting.

In order that the concept of the present invention may be more completely understood the following examples are set forth in which all parts are parts by weight unless otherwise indicated. These examples are set forth primarily for the purpose of illustration and any specific enumeration of details contained therein should not be interpreted as a limitation on the case except as is indicated in the appended claims.

*Example 1*

A solution of polyvinyl alcohol in water is prepared by slowly adding with constant stirring 500 parts of water to 19.3 parts of 88% hydrolyzed polyvinyl acetate having a weight average molecular weight of about 18,000–34,000 (Elvanol 51–05). The temperature of the suspension is raised to about 90°–95° C. and held there until solution is about complete, which takes about 20 minutes. While the solution is being cooled the reaction vessel is swept clear of air by a stream of carbon dioxide. At a temperature of about 18° C., 3.4 parts of ethyl acrylate are added followed by about 4.0 parts of one molar nitric acid and about 4.0 parts of 0.1 molar solution of ceric ammonium nitrate in 1 molar nitric acid. The reaction mixture is stirred for about 2 hours at 20–25° C. whereupon about 4.0 parts of 0.1 molar solution of ceric ammonium nitrate in 1 molar nitric acid is added. After stirring for about 2 hours at 20–25° C., the pH of the solution mixture is adjusted to about 3.0 with ethanolamine. A film is cast from the solution in the manner set forth hereinabove and is tough, flexible, clearly transparent, colorless, non-tacky, heat-sealable, and rapidly and completely soluble in water. The film remains flexible indefinitely when pressed between blotting paper, and seals strongly when moistened and pressed upon itself.

*Example 2*

The general procedure of Example 1 is repeated using a solution of 19.3 parts of polyvinyl acetate of varying degrees of hydrolysis and ethyl acrylate in amounts shown in the table below. The polyvinyl alcohol ("PVA") identified as A is polyvinyl acetate hydrolyzed to the extent of 88%, B is polyvinyl acetate hydrolyzed to the extent of 98% while C is polyvinyl acetate hydrolyzed to the extent of 99%. The details of these several runs are as follows.

| Film No. | Percent Ungrafter PVA | Grafted PVA | | Tensile Strength, p.s.i. | Rupture Time, Sec. | Soln. Time, Sec. | Stabil. at 93% R.H. |
|---|---|---|---|---|---|---|---|
| | | Percent | EA/PVA | | | | |
| 1 | 60.2 | 39.7 | 38/62 | 6,320 | 35 | 2.75 | Good. |
| 2 | 75.0 | 25.0 | 60/40 | 5,600 | 30 | 3.0 | Do. |

| PVA¹ | | Parts EA² | Parts Ceric³ | Parts⁴ HNO₃ | Ratio PVA/PEA | Percent EA² on PVA¹ | Water Solubility of Film |
|---|---|---|---|---|---|---|---|
| Desig. | Percent Hydrolyzed | | | | | | |
| A | 88 | 1.7 | 8.0 | 4 | 92/8 | 11.6 | Soluble. |
| A | 88 | 3.4 | 8.0 | 4 | 85/15 | 17.6 | Do. |
| B | 98 | 7.65 | 10.3 | | 72/28 | 38.9 | Insoluble. |
| B | 98 | 3.7 | 12.0 | 4 | 84/16 | 19.1 | Do. |
| B | 98 | 1.85 | 10.0 | 4 | 91/9 | 10.1 | Do. |
| C | 99 | 1.85 | 8.0 | 4 | 91/9 | 10.1 | Do. |

¹ Polyvinyl alcohol.
² Ethyl acrylate.
³ 0.1 molar solution of ceric ammonium nitrate in 1.0 molar nitric acid.
⁴ 1.0 molar nitric acid.

Example 3

To a solution of 120 parts of polyvinyl alcohol having a molecular weight of 34,000, in 750 parts of water at 20° C., there are added 9 parts of ethyl acrylate and about 10 parts of 0.1 molar solution of ceric ammonium nitrate in 1.0 molar nitric acid. This is followed by the simultaneous addition over a 15-minute period of 21 parts of ethyl acrylate and about 20 parts of 0.1 molar solution of ceric ammonium nitrate in 1.0 molar nitric acid. After two hours the pH is adjusted to about 3 with ethanolamine. Films drawn down from the solution and dried are strong, flexible, clear, colorless, and completely soluble in water.

The films have the properties of the films of Example 1.

Example 4

A blend of 40 parts of an 88% hydrolyzed polyvinyl acetate having a grafted content of 38 parts of ethyl acrylate and 62 parts of ungrafted 88% hydrolyzed polyvinyl acetate of 100,000 molecular weight is dissolved in water and the viscous solution is thoroughly stirred to achieve uniformity of the blend and films are drawn down therefrom in the conventional manner and dried. The procedure is repeated using a different ratio of materials. The films thus prepared from the polymer blends are tested for tensile strength and water solubility as indicated by the time required for rupture of the films in water at 28–32° C. and the time required for complete dissolution of the films together with tests directed to the stability of the film when exposed to high relative humidity. Results are as follows.

Example 5

A series of grafted copolymers of ethyl acrylate and partial hydrolyzed polyvinyl alcohol having various molecular weights are prepared and blended with ungrafted polyvinyl alcohol of various types. Films are then prepared from the polymer blends and the films are tested for water solubility. In compositions A, B and C, the polyvinyl alcohol is polyvinyl alcohol hydrolyzed 88%, whereas in compositions D and E the degree of hydrolysis is about 98–99%. In composition A the molecular weight is about 34,000 (low). In composition B the molecular weight is 138,000 (medium). In composition C the molecular weight is 174,000 (high). In composition D the molecular weight is 138,000 whereas in composition E the molecular weight is in excess of 174,000. The composition and the properties of the films drawn down from the compositions are as follows.

| Composition of Graft Copolymer | | Ungrafted PVA | | | Percent EA in Blends³ | Water Solubility |
|---|---|---|---|---|---|---|
| Percent EA¹ | Percent PVA² | Type | Percent Hydro. | MW | | |
| 78.8 | 21.2 | B | 88 | Medium | 5–35 | All soluble. |
| 71.8 | 28.2 | A | 88 | Low | 5–35 | Do. |
| 60.0 | 40.0 | A | 88 | do | 5–30 | Do. |
| 38.0 | 62.0 | A | 88 | do | 5–30 | Do. |
| 38.0 | 62.0 | B | 88 | Medium | 5–25 | Do. |
| 38.0 | 62.0 | C | 88 | High | 5–25 | Do. |
| 38.0 | 62.0 | D | 98 | Medium | 5–25 | All insoluble. |
| 38.0 | 62.0 | E | 98 | High | 5–20 | Do. |
| 25.0 | 75.0 | C | 88 | do | 5–20 | All soluble. |
| 25.0 | 75.0 | D | 98 | Medium | 5–20 | All insoluble. |
| 25.0 | 75.0 | E | 98 | High | 5–20 | Do. |

¹ Grafted ethyl acrylate.
² Polyvinyl alcohol.
³ 5% increments, based on total weight of blend.

Example 6

The following illustrates the effect of increasing amounts of grafted ester upon the water-solubility and strength of film of the present invention. The polyvinyl alcohol used is 88% hydrolyzed polyvinyl acetate having a molecular weight of about 18,000 (Elvanol 51–05); the grafted ester is ethyl acrylate grafted to the polyvinyl alcohol by the method of Example 1 in the amounts shown below. The film is formed by the method of Example 1 and is tested to determine its toughness (percent elongation), its tensile strength, tear strength, and water-solubility. Results are as follows.

| Run No. | Percent Ethyl Acrylate Grafted [1] | Percent Elongation | Tear, g./mil | Film | |
|---|---|---|---|---|---|
| | | | | Tensile, p.s.i. | Water Solubility [2] |
| Control | | 2.2 | 11 | 9,700 | 1.0 |
| 1 | 5 | 196 | 51 | 5,360 | 1.5 |
| 2 | 10 | 207 | 59 | 4,350 | 1.5 |
| 3 | 25 | 250 | 70 | 3,360 | 2.0 |
| 4 | 40 | 281 | 511 | 3,250 | 8.0 |
| 5 | 55 | 330 | 610 | 1,280 | >15 |

[1] Based on dry weight of the grafted film.
[2] Minutes to dissolve at 25° C.

The data show that the grafted acrylate ester causes a major percentage increase in the toughness (elongation and tear resistance) of the film at the expense of a minor percentage decrease in tensile strength, and that the resulting film dissolves rapidly in water. The resulting film is well suited for use as a water- and heat-sealing packaging material for detergents.

*Example 7*

The following illustrates the properties of film having a grafted content of esters of acrylic acid with aliphatic alcohols more than 5% soluble in water at 20° C.

The procedure of Example 1 is repeated, except that the acrylic acid esters grafted to the polyvinyl alcohol are esters of acrylic acid with the alcohols shown in the table below. Results are as follows.

| Run No. | Acrylic Acid Ester | | Film | |
|---|---|---|---|---|
| | Alcohol Esterified | Percent Grafted [1] | Tensile, p.s.i. | Water Sol'y. [2] |
| 1 | Methanol | 20 | 4,500 | 1.5 |
| 2 | Ethanol | 20 | 4,350 | 1.5 |
| 3 | Propanol | 20 | 4,150 | 2.0 |
| 4 | t-Butanol | 30 | 3,260 | 1.0 |
| 5 | 2-cyanoethanol | 40 | | 1.5 |
| 6 | Diethylene glycol [3] | 30 | 3,400 | 1.0 |
| 7 | 2-(methoxy)ethanol | 30 | 2,900 | 2.0 |

[1] Based on dry weight of product.
[2] In water at 25° C.
[3] Esterified with acrylic acid in 1:1 molar ratio.

I claim:

1. A sealed envelope composed of a self-supporting film of a dry, water-soluble, water- and heat-sealable film of a normally water-soluble linear polymer substantially composed of —CH$_2$CH(OH)— and —CH$_2$CH(OOCCH$_3$)— linkages in molar ratio between 95:5 and 80:20 having a weight average molecular weight between 15,000 and 150,000, toughened and permanently plasticized by a minor grafted content of an ester of acrylic acid with an aliphatic alcohol which is more than 5% soluble in water at 20° C.

2. A sealed envelope according to claim 1 wherein the polymer is substantially composed of —CH$_2$CH(OH)— and —CH$_2$CH(OOCCH$_3$)— linkages in molar ratio between 85:15 and 90:10.

3. A sealed envelope according to claim 1 wherein the molecular weight of the polymer is between 20,000 and 100,000.

4. A sealed envelope according to claim 1 wherein the acrylate is ethyl acrylate.

5. A sealed envelope composed of a self-supporting film of a dry, water-soluble water- and heat-sealable film consisting essentially of a uniform blend of (A) a water-soluble linear polymer having a molecular weight between 15,000 and 150,000 substantially composed of —CH$_2$CH(OH)— and —CH$_2$CH(OOCCH$_3$)— linkages in molar ratio between 80:20 and 95:5 having a grafted content of 10% to 80% by weight of an ester of acrylic acid with an aliphatic alcohol more than 5% by weight soluble in water at 20° C. and (B) a normally water-soluble flexible linear polymer having a molecular weight of at least 100,000 substantially composed of

—CH$_2$CH(OH)— and —CH$_2$CH(OOCCH$_3$)— linkages in molar ratio between 80:20 and 95:5 the weight of (B) being at least 10% of the weight of (A).

6. A sealed envelope according to claim 5 wherein the weight of the grafted acrylic ester is 20% to 30% of the weight of said film.

References Cited by the Examiner

UNITED STATES PATENTS

| | | | |
|---|---|---|---|
| 2,773,050 | 12/1956 | Caldwell et al. | 260—29.6 |
| 2,850,471 | 9/1958 | Klein | 260—31.6 |
| 2,922,768 | 1/1960 | Mino et al. | 260—885 |
| 3,032,518 | 5/1962 | Segro | 260—885 |
| 3,073,798 | 1/1963 | Baer | 260—876 |
| 3,083,172 | 3/1963 | Scott et al. | 260—885 |
| 3,157,527 | 11/1964 | Fournet et al. | 260—885 |
| 3,198,740 | 8/1965 | Dunlop et al. | 252—90 |

MURRAY TILLMAN, *Primary Examiner.*

J. T. GOOLKASIAN, *Assistant Examiner.*